United States Patent
Yamamoto et al.

(10) Patent No.: US 9,777,114 B1
(45) Date of Patent: Oct. 3, 2017

(54) METHOD FOR PRODUCING POLYPHENYLENE ETHER

(71) Applicant: ASAHI KASEI KABUSHIKI KAISHA, Tokyo (JP)

(72) Inventors: Shigeru Yamamoto, Tokyo (JP); Akira Mitsui, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/168,739

(22) Filed: May 31, 2016

(51) Int. Cl.
  *C08G 64/00* (2006.01)
  *C08G 65/44* (2006.01)
(52) U.S. Cl.
  CPC .................... *C08G 65/44* (2013.01)
(58) Field of Classification Search
  CPC ...................................... C08G 65/44
  USPC ....................................... 528/212
  See application file for complete search history.

(56) References Cited

U.S. PATENT DOCUMENTS

| | | | |
|---|---|---|---|
| 6,407,200 B1 | 6/2002 | Singh et al. | |
| 6,472,499 B1 | 10/2002 | Braat et al. | |
| 2002/0115822 A1 | 8/2002 | Braat et al. | |

FOREIGN PATENT DOCUMENTS

| | | |
|---|---|---|
| JP | 2004-504429 A | 2/2004 |
| JP | 2004-506078 A | 2/2004 |
| JP | 2004-531626 A | 10/2004 |

*Primary Examiner* — Terressa Boykin
(74) *Attorney, Agent, or Firm* — Birch, Stewart, Kolasch & Birch, LLP

(57) ABSTRACT

A method for producing a polyphenylene ether (PPE) provides the PPE that includes less gel and that is good in mechanical property and heat resistance, wherein the method includes a polymerization step of subjecting a phenol compound to oxidative polymerization in the presence of a polymerization catalyst in a good solvent for a polyphenylene ether to thereby provide a polyphenylene ether solution, a catalyst extraction step of adding an aqueous chelating agent solution to the polyphenylene ether solution and extracting the polymerization catalyst into the aqueous chelating agent solution to thereby provide a catalyst-removed polyphenylene ether solution, a concentration step of removing a part of the good solvent from the catalyst-removed polyphenylene ether solution to provide a concentrated polyphenylene ether solution, and a gel removal step of removing at least a visually observable chloroform-insoluble substance from the concentrated polyphenylene ether solution, to thereby provide a gel-removed polyphenylene ether solution.

9 Claims, 1 Drawing Sheet

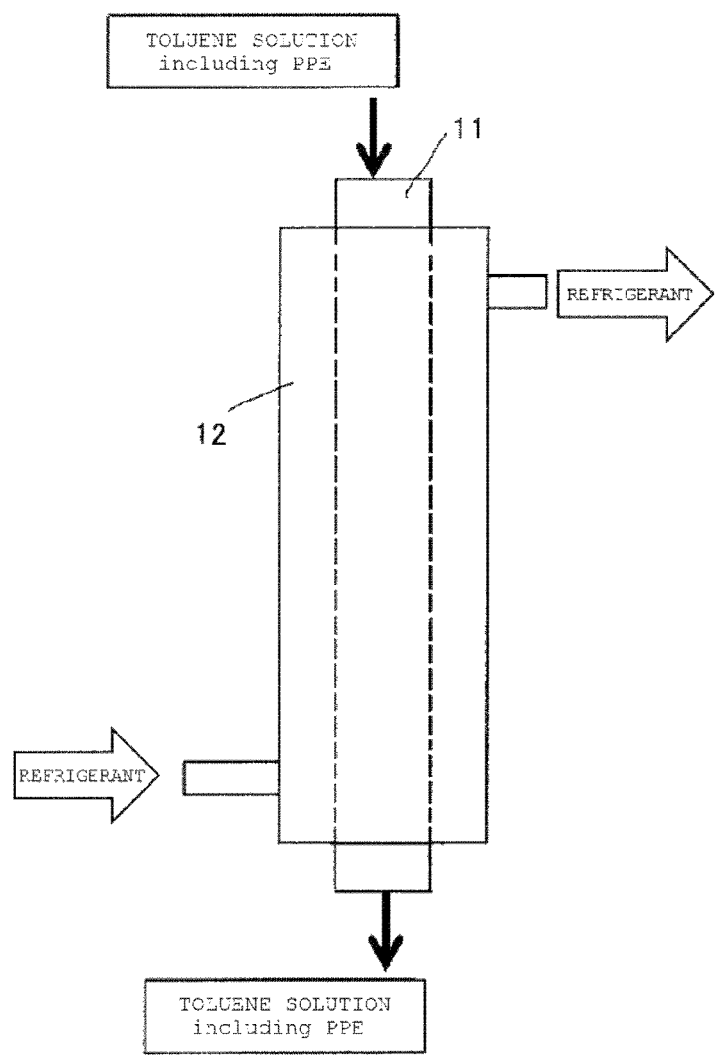

METHOD FOR PRODUCING POLYPHENYLENE ETHER

BACKGROUND OF THE INVENTION

Field of the Invention

The present invention relates to a method for producing a polyphenylene ether.

Description of the Related Art

A polyphenylene ether (hereinafter, sometimes simply referred to as "PPE"), and/or a resin composition including PPE and other thermoplastic resin (hereinafter, sometimes referred to as "modified PPE resin") have characteristics such as excellent electrical insulation, heat resistance, hydrolysis resistance and flame retardance, and enable to produce a product having a desired shape and various components by a molding method such as a melt injection molding method or a melt extrusion molding method, and therefore are widely used in materials for products and components in the electric and electronic fields, the automobile field and other various industrial material fields.

As a method for producing PPE, a method has been conventionally known which includes subjecting a phenol compound to oxidative polymerization in a good solvent for PPE, such as toluene, xylene or ethylbenzene, in the presence of a polymerization catalyst including a metal compound and an amine compound.

As a method for isolating PPE from the polyphenylene ether solution (which means a solution in which PPE is dissolved in the good solvent, and is also referred to as "PPE solution") obtained by the above method, a method has been known which includes adding a poor solvent for PPE, such as methanol, to the PPE solution to thereby precipitate PPE as a particle.

A method has also been proposed which includes performing, as the previous step of the precipitation, a step of heating the PPE solution to evaporate the good solvent for concentration of the PPE solution.

Patent Literature 1 describes a method for removing a part of a solvent for a PPE solution after oxidative polymerization to produce a concentrated liquid having a cloud point ($T_{cloud}$).

Patent Literature 1 describes the following: the concentrated liquid can be produced to thereby inhibit production of a fine PPE particle.

Patent Literature 2 describes a method including performing polymerization, with the concentration of a phenol being set to be about 5 to about 15% by mass based on the total amount of the phenol and a solvent, for the purpose of producing a poly(arylene ether) having a high intrinsic viscosity, and preliminarily concentrating the poly(arylene ether) prior to isolation by segmentation.

Patent Literature 2 describes the following: the method can be applied to thereby produce the poly(arylene ether) having a high intrinsic viscosity.

Patent Literature 3 mainly describes a method for removing a polymerization catalyst, and describes a method for concentrating a mixture of a polymer and a solvent, which can be arbitrarily performed.

Patent Literature 3 describes a method for enhancing the removal efficiency of the catalyst to decrease the remaining catalyst, but the method is not made by concentration of the mixture of a polymer and a solvent.

CITATION LIST

Patent Literatures

[Patent Literature 1] Japanese Unexamined Patent Application Publication (Translation of PCT Application) No. 2004-531626

[Patent Literature 2] Japanese Unexamined Patent Application Publication (Translation of PCT Application) No. 2004-506078

[Patent Literature 3] Japanese Unexamined Patent Application Publication (Translation of PCT Application) No. 2004-504429

SUMMARY OF THE INVENTION

Technical Problem

When the PPE solution is concentrated to further isolate PPE, it is necessary to isolate PPE from the PPE solution that is heated to the boiling point of the good solvent.

As a method for isolating PPE, there has been known a method including mixing the poor solvent with the concentrated PPE solution, to thereby precipitate a PPE particle.

If PPE is precipitated from a high-temperature concentrated PPE ether solution, however, a problem is that an ultrahigh-molecular component and/or a crosslinked product component (hereinafter, also referred to as "gel".) generated in the solution may be incorporated into PPE after isolation.

The gel incorporated in PPE is not usually molten at a molding temperature of PPE and remains as a foreign substance in a molded body, and therefore may generate a defect based on the foreign substance to thereby cause mechanical strength and heat resistance of a final product to be deteriorated.

Accordingly, there is a demand for a production method so that no gel is incorporated in a final product.

In view of the conventional technical problems, an object of the present invention is then to provide a method for producing PPE that includes less gel and that has good mechanical property and heat resistance.

Solution to Problem

The present inventor has made intensive studies in order to solve the above problems, and as a result, has found that, before a concentrated polyphenylene ether solution is mixed with a poor solvent to precipitate a PPE particle, a gel removal step of removing a visually observable chloroform-insoluble substance from the concentrated polyphenylene ether solution can be provided to thereby effectively decrease a residue of a foreign substance in a molded body and effectively prevent incorporation of a gel in a final product, leading to completion of the present invention.

That is, the present invention is as follows.

[1]

A method for producing a polyphenylene ether, comprising a polymerization step of subjecting a phenol compound to oxidative polymerization in the presence of a polymerization catalyst in a good solvent for a polyphenylene ether to thereby provide a polyphenylene ether solution;

a catalyst extraction step of adding an aqueous chelating agent solution to the polyphenylene ether solution and extracting the polymerization catalyst into the aqueous chelating agent solution to thereby provide a catalyst-removed polyphenylene ether solution;

a concentration step of removing a part of the good solvent from the catalyst-removed polyphenylene ether solution to provide a concentrated polyphenylene ether solution; and a gel removal step of removing at least a visually observable chloroform-insoluble substance from the concentrated polyphenylene ether solution, to thereby provide a gel-removed polyphenylene ether solution.

[2]

The method for producing the polyphenylene ether according to the above [1], wherein the concentration step is a step of bringing the catalyst-removed polyphenylene ether solution into contact with a heat source heated to a temperature that is higher than or equal to a boiling point of the good solvent and lower than or equal to a glass transition point of the polyphenylene ether.

[3]

The method for producing the polyphenylene ether according to the above [1] or [2], wherein the gel removal step is a step of bringing the concentrated polyphenylene ether solution into contact with a heat exchanger.

[4]

The method for producing the polyphenylene ether according to the above [3], wherein the heat exchanger is a bulkhead type heat exchanger.

[5]

The method for producing the polyphenylene ether according to the above [3] or [4], wherein, in the gel removal step, the concentrated polyphenylene ether solution is brought into contact with the heat exchanger whose temperature is lower than a temperature of the concentrated polyphenylene ether solution, to thereby precipitate at least a visually observable chloroform-insoluble substance on a surface of the heat exchanger.

[6]

The method for producing the polyphenylene ether according to any one of the above [1] to [5], further comprising a precipitation step of mixing the gel-removed polyphenylene ether solution with a solvent including a poor solvent for a polyphenylene ether, to precipitate a polyphenylene ether particle.

[7]

The method for producing the polyphenylene ether according to the above [6], wherein the precipitation step is performed with a temperature of the gel-removed polyphenylene ether solution being a temperature that is higher than or equal to a co-crystallization temperature of a polyphenylene ether and the good solvent for a polyphenylene ether and that is a boiling point of the poor solvent for a polyphenylene ether+15° C. or lower.

[8]

The method for producing the polyphenylene ether according to any one of the above [1] to [7], further comprising a drying step of feeding the gel-removed polyphenylene ether solution to a devolatilization extruder to isolate a polyphenylene ether.

[9]

The method for producing the polyphenylene ether according to any one of the above [1] to [8], wherein, in the polymerization step, a polymerization catalyst including a copper compound, a halogen compound, and a diamine compound represented by formula (1) is used as the polymerization catalyst:

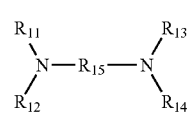

(1)

in formula (1), each of $R_{11}$, $R_{12}$, $R_{13}$ and $R_{14}$ each independently represents any selected from the group consisting of a hydrogen atom and a linear or branched alkyl group having 1 to 6 carbon atoms, provided that all of them do not represent hydrogen at the same time, and $R_{15}$ represents a linear or branched alkylene group having 2 to 5 carbon atoms.

Advantageous Effect of Invention

According to the method for producing PPE of the present invention, PPE that includes less gel and that is good in mechanical property and heat resistance can be provided.

BRIEF DESCRIPTION OF THE DRAWING

FIG. 1 illustrates a schematic side view of a heat exchanger having a double tube structure, used in Examples.

DETAILED DESCRIPTION OF THE PREFERRED EMBODIMENTS

Hereinafter, an embodiment for carrying out the present invention (hereinafter, referred to as "the present embodiment".) is described in detail. Herein, the present invention is not limited to the following embodiment, and can be variously modified and carried out within the scope thereof.

(Method for Producing Polyphenylene Ether)

A method for producing a polyphenylene ether of the present embodiment includes:

a polymerization step of subjecting a phenol compound to oxidative polymerization in the presence of a polymerization catalyst in a good solvent for a polyphenylene ether to thereby provide a polyphenylene ether solution;

a catalyst extraction step of adding an aqueous chelating agent solution to the polyphenylene ether solution and extracting the polymerization catalyst into the aqueous chelating agent solution to thereby provide a catalyst-removed polyphenylene ether solution;

a concentration step of removing a part of the good solvent from the catalyst-removed polyphenylene ether solution to provide a concentrated polyphenylene ether solution; and a gel removal step of removing at least a visually observable chloroform-insoluble substance from the concentrated polyphenylene ether solution, to thereby provide a gel-removed polyphenylene ether solution.

(PPE (Polyphenylene Ether))

PPE produced by the method for producing PPE of the present embodiment is described below.

PPE produced by the present embodiment is a homopolymer comprising a repeating unit structure represented by the following formula (2), and/or a copolymer including a repeating unit structure represented by the following formula (2).

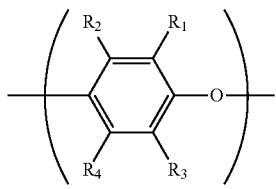

(2)

In the formula (2), each of $R_1$, $R_2$, $R_3$, and $R_4$ independently represents any selected from the group consisting of a hydrogen atom, a halogen atom, an alkyl group having 1 to 7 carbon atoms, a phenyl group, a haloalkyl group, an aminoalkyl group, a hydrocarbon oxy group, and a halohydrocarbon oxy group in which at least two carbon atoms separate a halogen atom and an oxygen atom.

In the formula (2), examples of the halogen atom represented by any of $R_1$, $R_2$, $R_3$, and $R_4$ include a fluorine atom, a chlorine atom and a bromine atom, and a chlorine atom and a bromine atom are preferable in terms of polymerization activity.

In the formula (2), when any of $R_1$, $R_2$, $R_3$, and $R_4$ represents an alkyl group, the "alkyl group" represents a linear or branched alkyl group preferably having 1 to 6 carbon atoms, more preferably 1 to 3 carbon atoms, in terms of polymerization activity.

Examples of the alkyl group include, but not limited to the following, methyl, ethyl, propyl, isopropyl, butyl, isobutyl, sec-butyl, tert-butyl, pentyl and hexyl. Methyl and ethyl are preferable, and methyl is more preferable.

In the formula (2), each hydrogen atom of the alkyl group represented by any of $R_1$, $R_2$, $R_3$, and $R_4$ may be replaced with a substituent.

Examples of such a substituent include, but not limited to the following, halogen atoms (for example, a fluorine atom, a chlorine atom and a bromine atom), aryl groups (for example, phenyl and naphthyl), alkenyl groups (for example, ethenyl, 1-propenyl and 2-propenyl), alkynyl groups (for example, ethynyl, 1-propynyl and 2-propynyl), aralkyl groups (for example, benzyl and phenethyl) and alkoxy groups (for example, methoxy and ethoxy).

<Reduced Viscosity>

The reduced viscosity of PPE obtained by the method for producing of the present embodiment is preferably in the range of from 0.15 to 1.0 dL/g, more preferably in the range of from 0.20 to 0.85 dL/g, further preferably in the range of from 0.25 to 0.70 dL/g.

A reduced viscosity of PPE of 0.15 dL/g or more tends to enable a more excellent mechanical property to be exhibited.

In addition, a reduced viscosity of 1.0 dL/g or less tends to enable the solution viscosity in polymerization to be effectively prevented from being excessively increased, enable the capacity of peripheral equipment of a polymerization tank to be properly controlled, allow the post-treatment to be easily performed, and also allow processability to be good.

The reduced viscosity of PPE can be measured by dissolving 0.5 g of PPE in chloroform and adjusting the concentration of a solution in chloroform to 1 g/dL, and subjecting the solution in chloroform to measurement using a constant-temperature oven for kinetic viscosity measurement (manufactured by Yoshida Kagaku Kikai Co., Ltd., product name: VB-M6P) at 30° C.

<Amount of Remaining Metal Catalyst>

In PPE obtained by the method for producing of the present embodiment, the amount of the remaining metal catalyst is preferably less than 1.0 ppm, more preferably less than 0.8 ppm, further preferably less than 0.6 ppm, still more preferably less than 0.4 ppm, further preferably less than 0.2 ppm.

Here, the amount of the remaining metal catalyst corresponds to an index of the purity of PPE itself.

An amount of the remaining metal catalyst of less than 1.0 ppm allows a high-purity PPE to be obtained, and furthermore, tends to enable yellowing after heat history to be effectively suppressed.

Herein, the amount of the remaining metal catalyst in PPE can be measured by an atomic absorption spectrophotometer (manufactured by Shimadzu Corporation, product name: AA-6650).

(Polymerization Step)

In a polymerization step of the method for producing PPE of the present embodiment, a phenol compound is subjected to oxidative polymerization in the presence of a polymerization catalyst in a good solvent for a polyphenylene ether. Preferably, a phenol compound and an oxygen-containing gas are brought into contact with each other in the presence of at least any selected from the group consisting of a metal compound, a halogen compound and an amine compound serving as a polymerization catalyst, in a good solvent for the phenol compound, to polymerize the phenol compound to provide a polyphenylene ether solution.

<Polymerization Raw Material: Phenol Compound>

PPE having the repeating unit structure represented by the formula (2) can be produced by polymerizing a phenol compound.

Examples of the phenol compound include, but not limited to the following, o-cresol, 2,6-dimethylphenol, 2-ethylphenol, 2-methyl-6-ethylphenol, 2,6-diethylphenol, 2-n-propylphenol, 2-ethyl-6-n-propylphenol, 2-methyl-6-chlorophenol, 2-methyl-6-bromophenol, 2-methyl-6-isopropylphenol, 2-methyl-6-n-propylphenol, 2-ethyl-6-bromophenol, 2-methyl-6-n-butylphenol, 2,6-di-n-propylphenol, 2-ethyl-6-chlorophenol, 2-methyl-6-phenylphenol, 2-phenylphenol, 2,6-diphenylphenol, 2,6-bis-(4-fluorophenyl)phenol, 2-methyl-6-tolylphenol, 2,6-ditolylphenol, 2,5-dimethylphenol, 2,3,6-trimethylphenol, 2,5-diethylphenol, 2-methyl-5-ethylphenol, 2-ethyl-5-methylphenol, 2-allyl-5-methylphenol, 2,5-diallylphenol, 2,3-diethyl-5-n-propylphenol, 2-methyl-5-chlorophenol, 2-methyl-5-bromophenol, 2-methyl-5-isopropylphenol, 2-methyl-5-n-propylphenol, 2-ethyl-5-bromophenol, 2-methyl-5-n-butylphenol, 2,5-di-n-propylphenol, 2-ethyl-5-chlorophenol, 2-methyl-5-phenylphenol, 2,5-diphenylphenol, 2,5-bis-(4-fluorophenyl)phenol, 2-methyl-5-tolylphenol, 2,5-ditolylphenol, 2,6-dimethyl-3-allylphenol, 2,3,6-triallylphenol, 2,3,6-tributylphenol, 2,6-di-n-butyl-3-methylphenol, 2,6-di-t-butyl-3-methylphenol, 2,6-dimethyl-3-n-butylphenol and 2,6-dimethyl-3-t-butylphenol.

In particular, 2,6-dimethylphenol, 2,6-diethylphenol, 2,6-diphenylphenol, 2,3,6-trimethylphenol and 2,5-dimethylphenol are preferable, and 2,6-dimethylphenol and 2,3,6-trimethylphenol are more preferable, because of being inexpensive and easily available.

The phenol compound may be used singly or in combinations of two or more.

Examples include a method of using 2,6-dimethylphenol and 2,6-diethylphenol in combination, a method of using 2,6-dimethylphenol and 2,6-diphenylphenol in combination, a method of using 2,3,6-trimethylphenol and 2,5-dimethylphenol in combination, and a method of using 2,6-dimethylphenol and 2,3,6-trimethylphenol in combination. The mixing ratio can be arbitrarily selected.

The phenol compound to be used may include small amounts of m-cresol, p-cresol, 2,4-dimethylphenol, 2,4,6-trimethylphenol, and the like which are by-products in production of the phenol compound.

<Good Solvent for Polyphenylene Ether>

The good solvent for PPE, to be used in the polymerization step of the method for producing PPE of the present embodiment, is preferably a solvent that can dissolve 5% by mass or more of PPE, more preferably a solvent that can dissolve 10% by mass or more of PPE, at 40° C. based on 100% by mass of the solvent.

Examples of the good solvent for PPE include, but not limited to the following, aromatic hydrocarbons such as benzene, toluene, xylene (including respective o-, m- and p-isomers), ethylbenzene and styrene; halogenated hydrocarbons such as chloroform, methylene chloride, 1,2-dichloroethane, chlorobenzene and dichlorobenzene; and nitro compounds such as nitrobenzene.

The above various good solvents may be used singly or in combinations of two or more.

Among them, aromatic hydrocarbons are preferable, an aromatic hydrocarbon having a boiling point in the range of from 70 to 150° C. is more preferable, and at least one selected from the group consisting of benzene, toluene and xylene is further preferable, in terms of solubility.

<Polymerization Catalyst>

A known catalyst system commonly used in production of PPE can be used as the polymerization catalyst for use in the polymerization step of the phenol compound.

The amount of the polymerization catalyst is not particularly limited, and the polymerization catalyst is preferably used at an amount in the range of from 0.25 mol to 50 mol based on 100 mol of the phenol compound to be used in the polymerization step.

As the polymerization catalyst, a metal compound, a halogen compound and an amine compound can be used as described above.

As the metal compound, for example, a catalyst system can be used which includes a transition metal ion that has oxidation-reduction ability and an amine compound that can form a complex with the metal ion, and specific examples include a catalyst system comprising a copper compound and an amine compound, a catalyst system comprising a manganese compound and an amine compound, and a catalyst system comprising a cobalt compound and an amine compound.

Among them, the catalyst system comprising a copper compound and an amine compound is preferable.

As the copper compound forming the polymerization catalyst, a cuprous compound, a cupric compound or a mixture thereof can be used.

Examples of the cuprous compound include, but not limited to the following, cuprous chloride, cuprous bromide, cuprous sulfate and cuprous nitrate.

Examples of the cupric compound include, but not limited to the following, cupric chloride, cupric bromide, cupric sulfate and cupric nitrate.

Among them, a particularly preferable copper compound includes cuprous chloride, cupric chloride, cuprous bromide, and cupric bromide.

Such a copper salt may be synthesized from an oxide (for example, cuprous oxide and cupric oxide), a carbonate, a hydroxide or the like and the corresponding halogen or acid, when used. A method often used is a method including mixing the cuprous oxide and/or cupric oxide exemplified above with a hydrogen halide (or a hydrogen halide aqueous solution) to prepare such a copper salt.

Examples of the halogen compound that can be used as the polymerization catalyst include, but not limited to the following, hydrogen chloride, hydrogen bromide, hydrogen iodide, sodium chloride, sodium bromide, sodium iodide, potassium chloride, potassium bromide, potassium iodide, tetramethylammonium chloride, tetramethylammonium bromide, tetramethylammonium iodide, tetraethylammonium chloride, tetraethylammonium bromide and tetraethylammonium iodide.

Such a compound can be used as an aqueous solution or a solution using a proper solvent. Among them, a preferable halogen compound includes an aqueous hydrogen chloride solution and an aqueous hydrogen bromide solution. Such a halogen compound can be used singly or in combinations of two or more.

The polymerization catalyst preferably includes a diamine compound represented by the following formula (1) as an amine compound, in addition to the above various catalysts.

The use of such a catalyst tends to enable the polymerization speed to be more increased to more decrease the polymerization time.

In addition, the adjustment of the amount of the catalyst, the amount of oxygen to be blown, the polymerization time, and the like tends to allow the molecular weight of PPE after polymerization to be more easily adjusted.

(1)

In the formula (1), each of $R_{11}$, $R_{12}$, $R_{13}$ and $R_{14}$ each independently represents any selected from the group consisting of a hydrogen atom and a linear or branched alkyl group having 1 to 6 carbon atoms, provided that all of them do not represent hydrogen at the same time. $R_{15}$ represents a linear or branched alkylene group having 2 to 5 carbon atoms.

Examples of the diamine compound represented by the formula (1) include, but not limited to the following, N,N,N',N'-tetramethylethylenediamine, N,N,N'-trimethylethylenediamine, N,N'-dimethylethylenediamine, N,N-dimethylethylenediamine, N-methylethylenediamine, N,N,N',N'-tetraethylethylenediamine, N,N,N'-triethylethylenediamine, N,N'-diethylethylenediamine, N,N-diethylethylenediamine, N-ethylethylenediamine, N,N-dimethyl-N'-ethylethylenediamine, N,N'-dimethyl-N-ethylethylenediamine, N-n-propylethylenediamine, N,N'-di-n-propylethylenediamine, N-i-propylethylenediamine, N,N'-di-i-propylethylenediamine, N-n-butylethylenediamine, N,N'-di-n-butylethylenediamine, N-i-butylethylenediamine, N,N'-di-i-butylethylenediamine, N-t-butylethylenediamine, N,N'-di-t-butylethylenediamine, N,N,N',N'-tetramethyl-1,3-diaminopropane, N,N,N'-trimethyl-1,3-diaminopropane, N,N'-dimethyl-1,3-diaminopropane, N-methyl-1,3-diaminopropane, N,N,N',N'-tetramethyl-1,3-diamino-1-methylpropane, N,N,N',N'-tetramethyl-1,3-diamino-2-methylpropane, N,N,N',N'-tetramethyl-1,4-diaminobutane and N,N,N',N'-tetramethyl-1,5-diaminopentane.

Among them, a diamine compound in which the number of carbon atoms in an alkylene group ($R_{15}$) that connects two nitrogen atoms in the formula (1) is 2 or 3 is preferable from the viewpoint of being capable of increasing the polymerization speed to more decrease the polymerization time.

The amount of the diamine compound to be used is not particularly limited, and the diamine compound is preferably used in the range of from 0.01 mol to 10 mol based on 100 mol of the phenol compound to be used in polymerization step.

The amine compound may further include, for example, at least one selected from the group consisting of a tertiary monoamine compound and a secondary monoamine compound, in addition to the above compound.

Examples of the tertiary monoamine compound include, but not limited to the following, an aliphatic tertiary amine including an alicyclic tertiary amine.

Examples of such a tertiary monoamine compound include, but not limited to the following, trimethylamine, triethylamine, tripropylamine, tributylamine, triisobutylamine, dimethylethylamine, dimethylpropylamine, allyldiethylamine, dimethyl-n-butylamine, diethylisopropylamine and N-methylcyclohexylamine.

Such a tertiary monoamine compound may be used singly or in combinations of two or more.

The amount of the tertiary monoamine compound to be used is not particularly limited, and it is preferably 15 mol or less based on 100 mol of the phenol compound to be used in the polymerization step.

The tertiary monoamine compound is not required to be initially added to the reaction system in the total amount to be usually used. That is, a part thereof may be added in the middle or a part thereof may be sequentially added after the initiation of polymerization. Alternatively, the tertiary monoamine compound may be added to or added together with a monomer (phenol compound) or a monomer solution, at the same time as the initiation of polymerization.

Specific examples of the secondary monoamine compound include, but not limited to the following, a secondary aliphatic amine.

Examples of the secondary aliphatic amine include, but not limited to the following, dimethylamine, diethylamine, di-n-propylamine, di-i-propylamine, di-n-butylamine, di-i-butylamine, di-t-butylamine, dipentylamine, dihexylamine, dioctylamine, didecylamine, dibenzylamine, methylethylamine, methylpropylamine, methylbutylamine and cyclohexylamine.

As the secondary monoamine compound, a secondary monoamine compound having an aromatic backbone can also be applied. Examples of the secondary monoamine compound having an aromatic backbone include, but not limited to the following, N-phenylmethanolamine, N-phenylethanolamine, N-phenylpropanolamine, N-(m-methylphenyl)ethanolamine, N-(p-methylphenyl)ethanolamine, N-(2',6'-dimethylphenyl)ethanolamine, N-(p-chlorophenyl)ethanolamine, N-ethylaniline, N-butylaniline, N-methyl-2-methylaniline, N-methyl-2,6-dimethylaniline and diphenylamine.

The above secondary monoamine compounds may be used singly or in combinations of two or more.

The amount of the secondary monoamine compound to be used is not particularly limited, and it is suitably 15 mol or less based on 100 mol of the phenol compound to be used in polymerization step.

Examples of the polymerization method in the polymerization step of PPE include, but not limited to the following, the method described in U.S. Pat. No. 3,306,874, which includes subjecting 2,6-xylenol to oxidative polymerization by use of a complex of a cuprous salt and an amine as a catalyst.

The methods described in U.S. Pat. Nos. 3,306,875, 3,257,357 and 3,257,358, Japanese Examined Patent Application Publication No. 52-17880, and Japanese Unexamined Patent Application Publication Nos. 50-51197 and 63-152628 are also preferable for the production method of PPE.

A surfactant that has been conventionally known to have the effect of enhancing polymerization activity may also be added into a polymerization solvent. Examples of such a surfactant include trioctylmethylammonium chloride known under the name of Aliquat 336 or CapRiquat (trade name, produced by Dojindo Molecular Technologies, Inc.). The amount thereof to be used is preferably in the range of not more than 0.1% by mass based on the total amount of a polymerization reaction raw material.

(Catalyst Extraction Step)

A catalyst extraction step is performed after the polymerization step.

In the catalyst extraction step, an aqueous chelating agent solution is added to the polyphenylene ether solution obtained in the polymerization step, to bring the polyphenylene ether solution and the aqueous chelating agent solution into contact with each other to thereby extract the polymerization catalyst into the aqueous chelating agent solution, and the polyphenylene ether solution and the aqueous chelating agent solution are subjected to liquid-liquid separation to remove the polymerization catalyst in the polyphenylene ether solution, providing a catalyst-removed polyphenylene ether solution.

Furthermore, a step of bringing the polyphenylene ether solution into contact with water for liquid-liquid separation can also be repeated to remove the catalyst.

Examples of the chelating agent include acids such as hydrochloric acid and acetic acid, ethylenediamine tetraacetic acid (EDTA) and a salt thereof, and nitrilotriacetic acid and a salt thereof.

The chelating agent is preferably added with being dissolved in a solvent that has a low dissolution ability of PPE and that generates phase separation from the good solvent for PPE, such as water.

In such a case, a deactivated polymerization catalyst is included in a phase of water or the like, and can be separated.

The amount of the chelating agent to be added is preferably 1 to 10-fold mol based on 1 mol of the polymerization catalyst.

(Concentration Step)

A concentration step is performed after the catalyst extraction step.

In the concentration step, the good solvent is separated from the catalyst-removed polyphenylene ether solution obtained in the catalyst extraction step, to provide a concentrated polyphenylene ether solution.

The method for concentrating PPE includes a method including bringing the catalyst-removed polyphenylene ether solution into contact with a heat source heated to a temperature that is higher than or equal to the boiling point of the good solvent and lower than or equal to the glass transition point of the polyphenylene ether. Specific examples include a method including heating the catalyst-removed polyphenylene ether solution to the boiling point of the good solvent to drain the good solvent as vapor to the outside of the system, a method including introducing the catalyst-removed polyphenylene ether solution into a pressure reduction tank to flush the good solvent, and a method including heating the catalyst-removed polyphenylene ether solution under pressurization and then subjecting it to pressure reduction to thereby flush the good solvent.

(Gel Removal Step)

A gel removal step is performed after the concentration step.

In the gel removal step, at least a visually observable chloroform-insoluble substance is removed from the concentrated polyphenylene ether solution, obtained in the concentration step, to provide a gel-removed polyphenylene ether solution.

PPE can be obtained from the gel-removed polyphenylene ether solution by a precipitation step, a solid-liquid separation step and a drying step described later.

The method for removing at least the visually observable chloroform-insoluble substance includes a method including bringing the polyphenylene ether concentrated, into contact with a heat exchanger.

Herein, the "at least visually" means at least removal of the visually observable chloroform-insoluble substance, and means that a visually unobservable insoluble substance may also be included as a substance to be removed.

FIG. 1 illustrates a schematic side view of one example of a heat exchanger for use in the present embodiment.

The heat exchanger has a double structure of a tube 11 and a tube 12 serving as a jacket, and a PPE solution can be allowed to flow in the tube 11 and a refrigerant can be allowed to flow in the tube 12, thereby cooling the PPE solution to precipitate a chloroform-insoluble substance on the wall surface of the tube 11.

The heat exchanger is not particularly limited, and examples thereof can include bulkhead type (also referred to as "indirect heating type" or "indirect cooling type"), heat storage type, and direct contact type heat exchangers.

A bulkhead type heat exchanger is preferably used in terms of safety.

As the bulkhead type heat exchanger, a tube type heat exchanger, a plate type heat exchanger, or a tube plate type heat exchanger is further preferably used in terms of good heat-exchange efficiency and operation stability.

The concentrated polyphenylene ether solution can be brought into contact with the heat exchanger whose temperature is lower than that of the solution, to thereby precipitate at least the visually observable chloroform-insoluble substance on the surface of the heat exchanger and remove it.

In a precipitation step described later, a general method is a method which includes bringing the gel-removed polyphenylene ether solution into contact with a poor solvent for PPE, thereby precipitating a particle of PPE to isolate PPE.

In the present embodiment, it is preferable that the temperature of the heat exchanger be adjusted and the temperature of the gel-removed polyphenylene ether solution be adjusted in the gel removal step depending on the poor solvent to be added in the precipitation step.

When the boiling point of the poor solvent to be used in the precipitation step is defined as Tn, the temperature of the gel-removed polyphenylene ether solution before contact with the poor solvent is preferably (Tn−10°) C. or higher and (Tn+15°) C. or lower. The temperature is preferably (Tn−10°) C. or higher, more preferably Tn° C. or higher in terms of the fine powder rate of a precipitate particle and stable productivity. The temperature is preferably (Tn+15°) C. or lower, more preferably (Tn+10°) C. or lower in terms of safety.

Specifically, when the glass transition temperature (Tg) of PPE is 210 to 220° C. and methanol (Tn=64° C.) is used as the poor solvent to be used in the precipitation step, a method is exemplified which includes bringing the concentrated polyphenylene ether solution into contact with the heat transfer surface of a heat exchanger at Tg−160 to 170° C.=40 to 60° C. to thereby cool it, attaching the gel to the heat exchanger to remove it, and reducing the temperature of the gel-removed polyphenylene ether solution to Tn−10 to Tn+15° C.=54 to 79° C. and then loading methanol for precipitation.

When the concentrated polyphenylene ether solution is cooled by the heat exchanger, a precipitate can be generated on the heat transfer surface of the heat exchanger to thereby enhance the quality of PPE.

This precipitate is a component having a specific molecular weight and/or being crosslinked in PPE, is at least a visually observable gel as an insoluble substance generated in dissolution of PPE in chloroform, and is one that may be a foreign substance in a final product.

Such a gel can be precipitated and removed to thereby improve the tensile strength retention rate and the deflection temperature under load (HDT) of a final product, resulting in enhancements in mechanical strength and heat resistance.

When the gel is removed as the precipitate in the heat exchanger, the larger the amount to be precipitated is, the smaller the flow passage area is, thereby resulting in remarkable deterioration in productivity. In addition, the precipitate can be more possibly peeled off and incorporated in the gel-removed polyphenylene ether solution.

In the present embodiment, the ratio (As) of the area of a flow passage (referred to as the cross sectional area of a flow passage) of the heat exchanger, the flow passage being clogged by the precipitate, to the area of a flow passage thereof, where no precipitate is present, can be 0.5% or more and 50% or less to thereby provide a PPE final product improved in terms of tensile strength retention rate and deflection temperature under load (HDT). The As is preferably 30% or less, more preferably 20% or less, further preferably 10% or less.

It is important for controlling the As to manage the temperature of the concentrated polyphenylene ether solution, and when the glass transition temperature of PPE is defined as Tg, the cooling lower limit temperature of a refrigerant that is allowed to flow in a jacket of the heat exchanger is preferably (Tg−170°) C. or higher, more preferably (Tg−160°) C. or higher.

(Precipitation Step)

A precipitation step is preferably performed after the gel removal step.

In the precipitation step, the gel-removed polyphenylene ether solution and a solvent including the poor solvent for a polyphenylene ether are mixed, thereby precipitating a PPE particle to provide a slurry liquid.

The poor solvent for PPE is a solvent that can dissolve only less than 5% by mass of PPE, preferably a solvent that can dissolve only less than 2% by mass of PPE, at 40° C. based on 100% by mass of the solvent.

Examples of the poor solvent can include, but not limited to the following, ketones, alcohols, and water. The poor solvent is preferably an alcohol having 1 to 10 carbon atoms.

Examples of such a poor solvent include, but not limited to the following, methanol, ethanol, propanol, isopropanol, n-butanol, 2-butanol, pentanol, hexanol, ethylene glycol, acetone, methyl ethyl ketone and water.

Among them, a more preferable poor solvent includes methanol, ethanol, isopropanol, n-butanol, 2-butanol, acetone, methyl ethyl ketone and water.

Such a poor solvent may be used singly or in combinations of two or more.

The precipitation step is preferably performed with the temperature of the gel-removed polyphenylene ether being higher than or equal to the co-crystallization temperature of a polyphenylene ether and the good solvent for a polyphenylene ether and being in the temperature range of the boiling point+15° C. or lower, of the poor solvent for a polyphenylene ether.

Thus, the effect of enabling to decrease a fine powder in the precipitate particle is achieved.

(Solid-Liquid Separation Step)

A solid-liquid separation step is preferably performed after the precipitation step.

In the solid-liquid separation step, the slurry liquid is subjected to solid-liquid separation to thereby provide wet PPE from which a filtrate is removed. Furthermore, a step of bringing the wet PPE into contact with a poor solvent-containing liquid for solid-liquid separation can also be repeated to remove the good solvent included in the wet PPE.

The state where the poor solvent is added to precipitate PPE is a so-called slurry liquid (suspension) state where the PPE particle is present in a mixed liquid of the good solvent and the poor solvent.

A first stage for isolation of PPE from the PPE slurry liquid is generally an operation for separation into the wet PPE and a filtrate by use of a solid-liquid separation apparatus.

Examples of the apparatus for performing solid-liquid separation include, but not limited to the following, a centrifuge (vibration type, screw type, decanter type, basket type and the like), a vacuum filter (drum type filter, belt filter, rotary vacuum filter, young filter, Nutsche, and the like), a filter press and a roll press.

(Washing Step)

A washing step is preferably performed after the solid-liquid separation step.

The wet PPE separated in the solid-liquid separation step contains a large amount of a good solvent component. This can also be washed using the poor solvent.

In the washing step, the wet PPE and the poor solvent can be brought into contact with each other to extract the good solvent, with which the PPE particle is impregnated, into the poor solvent.

After the completion of solid-liquid separation, a method including washing with separation by application of the poor solvent in the form of a spray to the wet PPE deposited on a filtration material can also be performed. The wet PPE and the poor solvent can also be mixed to provide a slurry again and subject the slurry to solid-liquid separation again. The step of slurry formation and solid-liquid separation can also be repeatedly performed until the amount of the good solvent, with which the PPE particle is impregnated, is reduced within a desired range.

(Pulverization Step)

A pulverization step may be performed after the washing step.

The wet PPE can be pulverized by a pulverizer and thus the fine powder rate can be adjusted.

The pulverizer is not particularly limited, and a jaw crusher, a cone crusher, a hammer mill, a feather mill, a ball mill, a high-speed rotation mill, a jet mill, or the like can be used.

(Drying Step)

In the method for producing a polyphenylene ether of the present embodiment, the gel-removed polyphenylene ether solution obtained in the gel removal step, the slurry liquid obtained in the precipitation step, and the wet PPE obtained in the solid-liquid separation step may be subjected to solvent removal by a drying step.

The drier to be used in the drying step is not particularly limited, and various driers, a combination of a heat exchanger and a flush tank, a devolatilization extruder, or the like can be used.

In particular, a method for directly devolatilizing the gel-removed polyphenylene ether solution and the slurry liquid may also be referred to as "direct devolatilization method", and a process can be simplified.

Herein, the residual volatile content included in PPE is preferably 1.5% by mass or less, more preferably 0.3% by mass or less, from the viewpoint of the working environment in post-processing and from the viewpoint that the gas of the residual volatile content in extrusion processing can be prevented from being back-flown, to keep stability of the operation.

EXAMPLES

Hereinafter, the present invention is described in detail with reference to Examples and Comparative Examples, but the present invention is not limited to the following Examples.

First, measurement methods of physical properties and characteristics, applied to Examples and Comparative Examples, are shown below.

(1) Reduced Viscosity ($\eta sp/c$)

PPE was dissolved in chloroform to prepare a 0.5 g/dL solution in chloroform.

The solution in chloroform was used as a sample and the reduced viscosity $\eta sp/c$ (dL/g) at 30° C. was determined by use of an Ubbellohde viscometer.

(2) Quantitative Determination of Residual Volatile Content (% by Mass) in PPE

The residual volatile content was quantitatively determined by subtracting the mass of the PPE powder dried under a reduced pressure in conditions of 185° C. and 0.1 mmHg for 5 hours from the mass of the PPE powder before the drying.

(3) Amount of Residual Catalyst Metal (Ppm by Mass)

The amount of the residual catalyst metal in PPE was measured by use of an atomic absorption spectrometer (manufactured by Shimadzu Corporation, AA6650).

(4) Confirmation of Visually Observable Chloroform-Insoluble Substance (Gel)

PPE obtained in each of Examples and Comparative Examples described later was used as a raw material to produce a molten resin of PPE in the following conditions.

As the production apparatus was used a "ZSK25 twin screw extruder" manufactured by Werner & Pfleiderer (Germany) (the number of barrels: 10, screw diameter: 25 mm, screw pattern having kneading discs L: 2 discs, kneading discs R: 8 discs, and kneading discs N: 4 discs), and the raw material was fed through the most upstream section (top feed) of the twin screw extruder.

In this twin screw extruder, a cylinder for screw insertion was configured by each block (barrel) 1 to 10, barrel 1 served as the raw material feed port located at the most upstream and barrel 10 was located immediately before the die head serving as the outlet of the molten resin melt kneaded. Barrels 4 and 8 had a vent port and were opened for performing.

Melt kneading was performed in conditions of a cylinder temperature of 310° C. and a number of screw rotations of 250 rpm to provide a molten resin of PPE.

In the melt kneading, 1 g of the molten resin was placed in a 50-mL glass bottle and dissolved in 10 mL of chloroform.

The solution in chloroform after dissolution was visually observed and the presence of a gel was confirmed.

When no gel was visually observed, a syringe permeation test was performed.

In the syringe permeation test, 2 mL of the solution in chloroform was sucked in a 3-mL syringe, and thereafter Millex (registered trademark) manufactured by Merck Millipore Corporation-LG filter (pore size: 0.20 μm) was mounted to the tip of the syringe to confirm the permeability of the solution.

It was found that a gel generated, which could not be visually confirmed, was hardly permeated through the filter. The presence of a gel was rated according to the following criteria.

x: A gel could be visually confirmed in a large amount.
Δ: A gel could be visually confirmed in a small amount.
○: A gel could not be visually confirmed, but filter clogging occurred in the syringe permeation test.
◉: A gel could not be visually confirmed, and no filter clogging also occurred in the syringe permeation test.

(5) Charpy Impact Strength (Before Aging) (kJ/m$^2$)

First, a modified-PPE composition pellet was prepared.

A PPE powder obtained in each of Examples and Comparative Examples described later, a general-purpose polystyrene (hereinafter, sometimes referred to as "GPPS") and an impact resistant polystyrene (hereinafter, sometimes referred to as "HIPS") were used as raw materials to prepare a modified-PPE composition pellet in the following conditions.

As the production apparatus was used a "ZSK25 twin screw extruder" manufactured by Werner & Pfleiderer (Germany).

40 parts by mass of the PPE powder and 30 parts by mass of the GPPS pellet were fed through the upstream inlet of the twin screw extruder, and the HIPS pellet was fed through the midstream inlet of the twin screw extruder.

Melt kneading was performed in conditions of a cylinder temperature of 300° C., a number of screw rotations of 200 rpm and vacuum degassing at −700 mmHg to prepare a modified-PPE composition pellet.

Next, the modified-PPE composition pellet was used to prepare a molded piece.

A modified-PPE composition pellet obtained in each of Examples and Comparative Examples described later was molded to produce each of a strip molded piece having a thickness of 0.32 cm and a dumbbell molded piece having a thickness of 0.32 cm.

As the molding machine was used an injection molding machine IS-80EPN manufactured by Toshiba Machine Co., Ltd. (molding temperature: 330° C., die temperature: 120° C.)

The molded piece was used for measurement of the Charpy impact strength, and the impact resistance was evaluated according to ISO-179 and measured as the notched impact resistance.

(6) Heat Aging Evaluation (Charpy Impact Strength Retention Rate (%) after Aging)

The strip molded piece was used to perform aging for 500 hours in an air circulation oven set at 120° C. and thereafter left to stand in an environment of a room temperature of 23° C. and a humidity of 50% for 24 hours, thereafter a notch according to ISO-179 was prepared on the strip molded piece to measure the Charpy impact strength, and the degree of change in the impact resistance (retention rate relative to the Charpy impact strength before heat aging; %) was measured.

(7) Measurement of Tensile Strength (MPa)

The measurement was performed according to ASTM D-648 by use of the dumbbell molded piece having a thickness of 0.32 cm described in (5) above at a testing speed of 5 mm/min and a distance between tensile chucks of 115 mm.

(8) Measurement of Bending Strength (MPa)

The measurement was performed according to ASTM D-790 by use of the strip molded piece having a thickness of 0.32 cm described in (5) above at a testing speed of 3 mm/min and a distance between supporting points of 101.6 mm.

Example 1

To a 40-L polymerization tank equipped with a jacket, provided with a sparger for oxygen-containing gas introduction, a stirring turbine blade and a baffle at the bottom of the polymerization tank and provided with a reflux condenser in a vent gas line at the upper portion of the polymerization tank, were loaded 4.57 g of cupric oxide, 24.18 g of an aqueous 47% by mass hydrogen bromide solution, 11.00 g of N,N'-di-t-butylethylenediamine, 62.72 g of di-n-butylamine, 149.92 g of dimethyl-n-butylamine, 20.65 kg of toluene, and 3.12 kg of 2,6-dimethylphenol (produced by Asahi Kasei Plastics Singapore Pte Ltd., product name: 2,6-xylenol) while a nitrogen gas being blown into at a flow rate of 0.5 NL/min, and the resultant was stirred until a uniform solution was obtained and the inner temperature of the polymerization tank reached 25° C.

Next, dry air was started to be introduced through the sparger to the polymerization tank at a rate of 32.8 NL/min, to initiate polymerization.

Dry air was allowed to pass for 125 minutes, to provide a polymerization mixture.

Herein, the inner temperature was controlled so as to be 40° C. during polymerization. The polymerization liquid (polyphenylene ether solution) at the termination of polymerization was in the state of a uniform solution.

Passing of dry air was stopped, and 10 kg of a 2.5% by mass solution of tetrasodium ethylenediamine tetraacetate (reagent produced by Dojindo Molecular Technologies, Inc.) in water was added to the polymerization mixture.

The polymerization mixture was stirred at 70° C. for 150 minutes and thereafter left to stand for 20 minutes, and separated to an organic phase and an aqueous phase by liquid-liquid separation.

The organic phase fractionated was a toluene solution (catalyst-removed polyphenylene ether solution) including 13.1% by mass of PPE in toluene.

To a 40-L stirring tank equipped with a jacket was loaded 20 kg of the organic phase, an oil at 120° C. was allowed to flow in the jacket, and a nitrogen gas at 5 NL/min was blown into a gas phase portion under heating and stirring.

A vent gas in the stirring tank allowed a liquid mainly including toluene to be concentrated through a cooling tube and to be drained to the outside of the stirring tank.

When the mass of the liquid drained to the outside of the stirring tank reached 13.4 kg, the amount of nitrogen to be blown into the gas phase portion was decreased to 0.1 mNL/min, to provide a concentrated polyphenylene ether solution.

A drain nozzle provided at the bottom of the stirring tank was connected to a gear pump, and the concentrated polyphenylene ether solution was fed at a flow rate of 390 g/min through a single tube (heat exchanger) equipped with a jacket, to a 1.2-L precipitation tank equipped with a jacket.

FIG. 1 illustrates a schematic shape of the single tube (heat exchanger) equipped with a jacket.

The single tube equipped with a jacket is a heat exchanger having a double tube structure prepared by use of a tube 11 made of SUS304, having a nominal diameter of 8 A (inner diameter: 9.2 mm, outer diameter: 13.8 mm) and a length of 300 mm, and a tube 12 made of SUS304, having a nominal diameter of 20 A (inner diameter: 21.6 mm, outer diameter: 27.2 mm) and a length of 250 mm.

Warm water at 40° C. was allowed to flow in the tube 12 constituting the jacket of the single tube, and the temperature of a gel-removed polyphenylene ether solution at the outlet of the tube 11 was then 62° C.

A polymer in the form of a thin film having a thickness of 0.2 mm was attached as a scale to the inside of the single tube equipped with a jacket.

A mixed liquid of 500 g of toluene and 500 g of methanol was placed in the precipitation tank in advance, and stirred and mixed.

As the stirring blade here was used a stirring blade which was an inclined paddle type single stage blade of four blades and whose diameter was one third of the inner diameter of the precipitation tank, and stirring was performed at 1500 rpm. The precipitation tank had a configuration in which four baffles were provided and, when the amount was more than 1.2 L, an excess was overflown and drained to the outside of the tank.

To the precipitation tank were fed 395 g/min of the gel-removed polyphenylene ether solution and 240 g/min of methanol including 6% by mass of water.

PPE was precipitated as a particle, and was formed into a slurry in a filtrate consisting of toluene/methanol/water. The slurry liquid was drained through an overflow line.

The slurry liquid was fractionated every 1 L, and filtered under reduced pressure by use of a glass filter (solid-liquid separation step). 1 L of methanol was again added to the resulting wet PPE, and the resultant was stirred and thereafter filtered under reduced pressure (washing step). The amount of the wet PPE was about 5 kg. The wet PPE was placed in a vacuum drier and dried at 140° C. and 1 mmHg to provide about 2.5 kg of PPE powder (1) (drying step).

PPE powder (1) was evaluated according to Evaluations (1) to (8) above.

The evaluation results are shown in Table 1 below.

Example 2

The passing time of dry air was 95 minutes. Other conditions were the same as those in Example 1 to provide about 2.5 kg of PPE powder (2). PPE powder (2) was evaluated according to Evaluations (1) to (8) above.

The evaluation results are shown in Table 1 below.

Comparative Example 1

After 20 kg of an organic phase was concentrated until the mass of a liquid drained by use of a stirring tank, in which an oil at 120° C. was allowed to pass in a jacket, reached 13.4 kg, a method including reducing the oil temperature in the jacket of the stirring tank from 120° C. to 65° C. under stirring in the stirring tank for cooling until the temperature of the concentrated polyphenylene ether solution reached 62° C., and thereafter feeding the solution to a 1.2-L precipitation tank equipped with a jacket was adopted, instead of a method including feeding the solution to a 1.2-L precipitation tank equipped with a jacket through a single tube (heat exchanger) equipped with a jacket in which warm water at 35° C. was allowed to pass.

Other conditions were the same as those in Example 1 to provide about 2.5 kg of PPE powder (3).

PPE powder (3) was evaluated according to Evaluations (1) to (8) above.

The evaluation results are shown in Table 1 below.

Comparative Example 2

After 20 kg of an organic phase was concentrated until the mass of a liquid drained by use of a stirring tank, in which an oil at 120° C. was allowed to pass in a jacket, reached 13.4 kg, a method including reducing the oil temperature in the jacket of the stirring tank from 120° C. to 65° C. under stirring in the stirring tank for cooling until the temperature of the concentrated polyphenylene ether solution reached 62° C., and thereafter feeding the solution to a 1.2-L precipitation tank equipped with a jacket was adopted, instead of a method including feeding the solution to a 1.2-L precipitation tank equipped with a jacket through a single tube (heat exchanger) equipped with a jacket in which warm water at 35° C. was allowed to pass.

Other conditions were the same as those in Example 2 to provide about 2.5 kg of PPE powder (4).

PPE powder (4) was evaluated according to Evaluations (1) to (8) above.

The evaluation results are shown in Table 1 below.

TABLE 1

| | | Example 1 | Example 2 | Comparative Example 1 | Comparative Example 2 |
|---|---|---|---|---|---|
| Polymerization time | [minute] | 125 | 95 | 125 | 95 |
| Gel removal step by heat exchanger after concentration | | Present | Present | Absent | Absent |
| Reduced viscosity ηsp/c | [dL/g] | 0.51 | 0.37 | 0.52 | 0.37 |
| Residual volatile content | [% by mass] | 0.29 | 0.25 | 0.31 | 0.26 |
| Amount of residual catalyst metal | [ppm by mass] | 0.66 | 0.31 | 0.68 | 0.33 |
| Confirmation of visually observable gel | | ○ | ◉ | X | Δ |
| Charpy impact strength (before aging) | [KJ/m$^2$] | 12.8 | 12.8 | 9.5 | 9.7 |
| Charpy impact strength retention rate after aging | [%] | 78 | 80 | 69 | 66 |
| Tensile strength | [MPa] | 87 | 88 | 78 | 80 |
| Bending strength | [MPa] | 2198 | 2222 | 2047 | 2078 |

As shown in Table 1, PPE including less gel and being good in mechanical property and heat resistance was obtained in each of Examples 1 and 2.

INDUSTRIAL APPLICABILITY

The method for producing a polyphenylene ether of the present invention has an industrial applicability as a method for producing a polyphenylene ether that is suitably utilized in the automobile, OA communication equipment, liquid handling industry, and electric and electronic fields as it is or as a composition with other resin.

REFERENCE SIGNS LIST

11: tube
12: tube

What is claimed is:

1. A method for producing a polyphenylene ether, comprising:
   a polymerization step of subjecting a phenol compound to oxidative polymerization in the presence of a polymerization catalyst in a good solvent for a polyphenylene ether to thereby provide a polyphenylene ether solution;
   a catalyst extraction step of adding an aqueous chelating agent solution to the polyphenylene ether solution and extracting the polymerization catalyst into the aqueous chelating agent solution to thereby provide a catalyst-removed polyphenylene ether solution;
   a concentration step of removing a part of the good solvent from the catalyst-removed polyphenylene ether solution to provide a concentrated polyphenylene ether solution; and
   a gel removal step of removing a visually observable chloroform-insoluble substance from the concentrated polyphenylene ether solution, to thereby provide a gel-removed polyphenylene ether solution.

2. The method for producing the polyphenylene ether according to claim 1, wherein
   the concentration step comprises a step of bringing the catalyst-removed polyphenylene ether solution into contact with a heat source heated to a temperature that is higher than or equal to a boiling point of the good solvent and lower than or equal to a glass transition point of the polyphenylene ether.

3. The method for producing the polyphenylene ether according to claim 1, wherein
   the gel removal step comprises a step of bringing the concentrated polyphenylene ether solution into contact with a heat exchanger.

4. The method for producing the polyphenylene ether according to claim 3, wherein the heat exchanger is a bulkhead heat exchanger.

5. The method for producing the polyphenylene ether according to claim 3, wherein
   a temperature of the heat exchanger is lower than a temperature of the concentrated polyphenylene ether solution, to thereby precipitate the visually observable chloroform-insoluble substance on a surface of the heat exchanger.

6. The method for producing the polyphenylene ether according to claim 1, further comprising a precipitation step of mixing the gel-removed polyphenylene ether solution with a poor solvent for a polyphenylene ether, to precipitate a polyphenylene ether particle.

7. The method for producing the polyphenylene ether according to claim 6, wherein
   a temperature of the gel-removed polyphenylene ether solution is higher than or equal to a co-crystallization temperature of a polyphenylene ether and the good solvent for a polyphenylene ether and is equal to a boiling point of the poor solvent for a polyphenylene ether+15° C. or lower to perform the precipitation step.

8. The method for producing the polyphenylene ether according to claim 1, further comprising a drying step of feeding the gel-removed polyphenylene ether solution to a devolatilization extruder to isolate a polyphenylene ether.

9. The method for producing the polyphenylene ether according to claim 1, wherein,
   in the polymerization step, the polymerization catalyst comprises a copper compound, a halogen compound, and a diamine compound represented by formula (1):

where, each of $R_{11}$, $R_{12}$, $R_{13}$ and $R_{14}$ each independently represents any selected from the group consisting of a hydrogen atom and a linear or branched alkyl group having 1 to 6 carbon atoms, provided that all of them do not represent hydrogen at the same time, and $R_{15}$ represents a linear or branched alkylene group having 2 to 5 carbon atoms.

\* \* \* \* \*